(12) United States Patent
Chung et al.

(10) Patent No.: US 9,477,117 B2
(45) Date of Patent: Oct. 25, 2016

(54) OPTICAL LENS MODULE AND BACKLIGHT UNIT

(71) Applicant: Samsung Display Co., Ltd., Yongin (KR)

(72) Inventors: Seung Hwan Chung, Asan-si (KR); Dong-Yeol Yeom, Suwon-si (KR); Joong Hyun Kim, Asan-si (KR); Jin Sook Bang, Ansan-si (KR); Sang Woo Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 317 days.

(21) Appl. No.: 14/107,727

(22) Filed: Dec. 16, 2013

(65) Prior Publication Data

US 2015/0029692 A1   Jan. 29, 2015

(30) Foreign Application Priority Data

Jul. 24, 2013  (KR) .................. 10-2013-0087488

(51) Int. Cl.
*F21V 9/00* (2015.01)
*G02F 1/1335* (2006.01)
*G02B 5/30* (2006.01)

(52) U.S. Cl.
CPC ....... *G02F 1/133606* (2013.01); *G02B 5/3016* (2013.01); *G02B 5/3058* (2013.01); *G02F 1/13362* (2013.01); *G02F 1/133603* (2013.01); *G02F 1/133611* (2013.01); *G02F 2001/133545* (2013.01); *G02F 2001/133607* (2013.01)

(58) Field of Classification Search
CPC ............... F21V 9/14; G02F 1/133602; G02F 1/133606; G02F 2001/133607
See application file for complete search history.

(56) References Cited

U.S. PATENT DOCUMENTS

| | | | |
|---|---|---|---|
| 7,245,072 B2 | 7/2007 | Ouderkirk et al. | |
| 7,348,723 B2 | 3/2008 | Yamaguchi et al. | |
| 7,352,124 B2 * | 4/2008 | Beeson ................ | G02B 27/28 257/100 |
| 7,508,467 B2 | 3/2009 | Odake et al. | |
| 7,621,657 B2 | 11/2009 | Ohkawa | |
| 7,798,679 B2 | 9/2010 | Kokubo et al. | |
| 7,815,355 B2 | 10/2010 | Thompson et al. | |
| 2005/0219464 A1 | 10/2005 | Yamasaki et al. | |
| 2006/0091412 A1 * | 5/2006 | Wheatley ............... | H01L 33/44 257/98 |
| 2006/0187650 A1 | 8/2006 | Epstein et al. | |
| 2009/0103310 A1 * | 4/2009 | Chen .................. | G02B 6/4298 362/307 |
| 2010/0165660 A1 | 7/2010 | Weber et al. | |
| 2010/0214762 A1 | 8/2010 | Nevitt et al. | |

FOREIGN PATENT DOCUMENTS

| | | |
|---|---|---|
| JP | 2007-304460 | 11/2007 |
| KR | 10-1189134 | 10/2012 |
| KR | 10-2013-0003400 | 1/2013 |

* cited by examiner

*Primary Examiner* — Julie Bannan
(74) *Attorney, Agent, or Firm* — H.C. Park & Associates, PLC (57) ABSTRACT

A backlight unit which provides light to a liquid crystal display panel of a liquid crystal display. The backlight unit includes an optical lens module including an optical lens disposed above a point light source and configured to refract light output from the point light source, and a reflective polarization layer disposed directly on the optical lens and configured to separate polarization components of the light to transmit one polarization component and reflect another polarization component.

21 Claims, 10 Drawing Sheets

OPTICAL LENS MODULE AND BACKLIGHT UNIT

CROSS-REFERENCE TO RELATED APPLICATION

This application claims priority from and the benefit of Korean Patent Application No. 10-2013-0087488, filed on Jul. 24, 2013, which is hereby incorporated by reference for all purposes as if fully set forth herein.

BACKGROUND

1. Field

Exemplary embodiments of the present invention relate to a backlight unit that supplies light to a liquid crystal display panel of a liquid crystal display.

2. Discussion of the Background

A liquid crystal display (LCD) is a widely-used flat panel display. In general, in a display panel of the LCD, a liquid crystal material is filled between an upper substrate on which a common electrode and a color filter are formed, and a lower substrate on which a thin film transistor and a pixel electrode are formed. Different electrical potentials are applied to the pixel electrode and the common electrode to generate an electric field to change alignment of liquid crystal molecules in the liquid crystal material and, as a result, adjust light transmittance to display an image on the display panel.

Because a liquid crystal display panel of the LCD is a non-emissive light receiving device, a backlight unit is generally required in the LCD to provide light to the liquid crystal display panel from the lower part of the liquid crystal display panel.

In the backlight unit, a cold cathode fluorescent lamp (CCFL) or a light emitting diode (LED) is generally used as a light source. In the related art, the CCFL, which provides bright white light with low power consumption, is mainly used. However, an LED, which has advantages such as excellent color reproducibility, long life-span, and low power consumption as compared with the CCFL, is increasingly being used.

The backlight unit is classified into an edge-type and a direct-type in accordance with a position of the light source with respect to the liquid crystal display panel. In the edge-type, a light source is disposed at a side of the liquid crystal display panel to provide light through a light guide at the side. In the direct-type, the light source is disposed at a rear side of the liquid crystal display panel to provide light to the liquid crystal display panel. Between the edge-type and the direct-type, the direct-type backlight unit has advantages of high light utilization coefficient, simple treatment, no limitation of size of the display panel, and relatively low cost.

When the LED, which is a point light source, is used as a light source of the direct-type backlight unit, an optical lens is provided above the light emitting surface of an LED package to refract the LED light. This is done to prevent concentration of LED light, which travels in a straight line, above a light-emitting surface and, instead, to distribute LED light over the entire liquid crystal display panel. Generally, a diffuser sheet and a prism sheet are disposed above the optical lens. The diffuser sheet changes light passing through the optical lens into a surface light source having a uniform brightness, and the prism sheet changes side light into front light and focuses radiating light.

In order to improve optical efficiency of the liquid crystal display, a reflective polarization sheet (also referred to as a "reflective polarization film"), which converts a light component to be absorbed by a polarizer of the liquid crystal display panel into light which is to be transmitted by the polarizer, may be disposed on an upper surface of the backlight unit.

The above information disclosed in this Background section is only for enhancement of understanding of the background of the invention and therefore it may contain information that does not constitute the prior art.

SUMMARY

Exemplary embodiments of the present invention provide an optical lens module and a backlight unit which may improve optical efficiency.

Exemplary embodiments of the present invention also provide an optical structure which may reduce manufacturing costs and a weight of a product while reducing optical losses, and a backlight unit including the same.

Additional aspects will be set forth in part in the description which follows and, in part, will be apparent from the description, or may be learned by practice of the invention.

An exemplary embodiment of the present invention discloses an optical lens module including: an optical lens disposed above a point light source and configured to refract light output from the point light source; and a reflective polarization layer disposed directly on the optical lens and configured to separate polarization components of the light so as to transmit one polarization component and reflect another polarization component.

An exemplary embodiment of the present invention also discloses a direct-type backlight unit including: a point light source; an optical lens disposed above a point light source and configured to refract light output from the point light source; a reflective polarization layer disposed directly on the optical lens and configured to separate polarization components of the light so as to transmit one polarization component and reflect another polarization component; and a reflective layer disposed below the optical lens and configured to reflect the polarization component which is reflected by the reflective polarization layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 7A, 7B, 8A, and 8B are diagrams illustrating a position where a high reflective layer is applied, where FIGS. 7A and 8A are cross-sectional views and FIGS. 7B and 8B are plan views.

DETAILED DESCRIPTION OF THE ILLUSTRATED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, like reference numerals denote like elements, and the sizes and thicknesses of layers and regions may be exaggerated or downscaled for clarity.

It will be understood that when an element such as a layer, film, region, or substrate is referred to as being "on" another element, it can be directly on the other element, or intervening elements may also be present. In contrast, when an element is referred to as being "directly on" another element, there are no intervening elements present. In the specification, the terminology "layer" may include any of a film, a sheet, and a plate which have a width and a thickness. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A backlight unit and an optical lens module which may be applied thereto will now be described with reference to the drawings.

Figure 1:
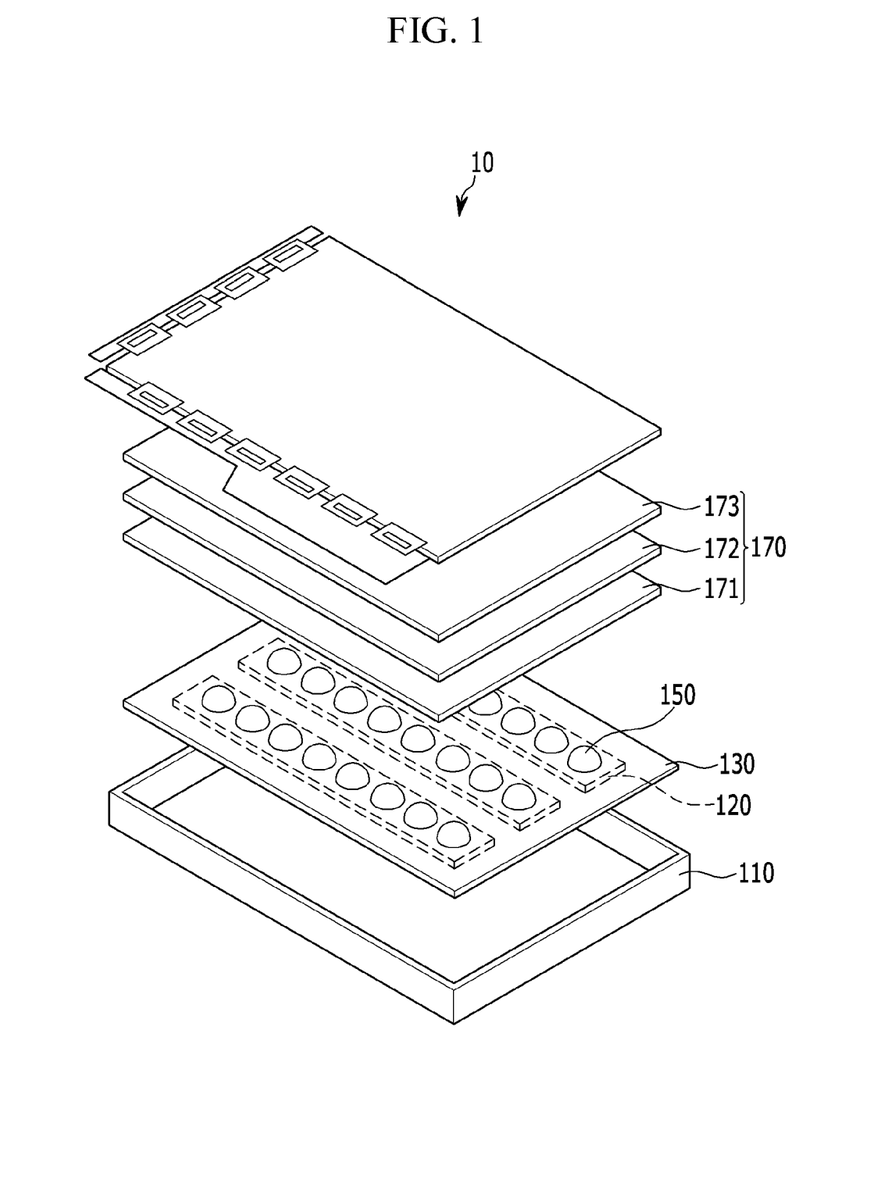
FIG. 1 is an exploded perspective view schematically illustrating a backlight unit according to an exemplary embodiment of the present invention.

FIG. 1 is an exploded perspective view schematically illustrating a backlight unit according to an exemplary embodiment of the present invention. A backlight unit 10 may be configured such that a light source unit, optical elements, and electrical elements are accommodated in a frame 110.

Specifically, the light source unit may include at least one light source body in which LED packages (which are blocked by an optical lens 150 and, thus, are not illustrated in FIG. 1) are mounted on a substrate 120, which is a strip printed circuit board (PCB), at an interval. The number of the light source bodies and LED packages may vary depending on a size of the liquid crystal display panel, an output of the LED, and a desired luminance of the liquid crystal display.

A white LED package that emits white light may be used for the LED package or red, green, and blue LED packages may be used for the LED package. The LED package may be a high intensity or ultra-high intensity LED package with a large light emitting surface. The LED package may be, for example, a high color reproduction LED package that emits green light and magenta light. One LED package may include one or more LED chips.

A reflective layer 130 is disposed on the substrate 120, and the optical lens 150 is disposed on the LED package. As seen from above, the substrate 120 is arranged below and, thereby, blocked by the reflective layer 130 so that the substrate 120 is illustrated with a dotted line in FIG. 1.

The reflective layer 130 may reflect light emitted from the LED package and light reflected by the optical lens 150, or another structure, to be finally directed to the liquid crystal display panel to increase optical efficiency. A hole may be formed in a portion of the reflective layer 130 where the LED package may be positioned so that the LED package is mounted on the substrate 120. The reflective layer 130 may include at least one reflective layer. For example, the reflective layer 130 may include a normal reflective layer such as a white reflective film and/or a reflective layer with a relatively high reflectance, such as a silver reflective film.

The optical lens 150 is provided so that the light emitted from the LED, which is a point light source, is not concentrated above a light emitting surface of the LED package, but is instead uniformly distributed over the entire liquid crystal display panel. The optical lens 150, which is used to establish luminance uniformity, may be also called an "optical beam angle lens". The optical lens 150 is provided on the light emitting surface of the LED package to refract light of the LED. The optical lenses 150 may be provided on the substrate 120 for each of the LED packages, so as to individually cover the LED packages. The optical lens 150 may be formed of a transparent material, such as polycarbonate (PC), polymethyl methacrylate (PMMA), or silicon.

A reflective polarization layer (not illustrated), which can split polarization components of light to transmit and reflect the light, may be disposed directly on the optical lens 150. The reflective polarization layer will be described in detail below.

Optical sheets 170 are disposed above the reflective polarization layer. Each optical sheet 170 may include a diffuser sheet 171, a prism sheet 172, and a protecting sheet 173.

The diffuser sheet 171 scatters the light passing through the reflective polarization layer to be changed into a surface light source with a more uniform brightness. The prism sheet 172 focuses the light while adjusting a traveling direction of the light, which is uniformly diffused by the diffuser sheet 171, to increase luminance. The protecting sheet 173 protects a prism of the prism sheet 172 from being scratched. The protecting sheet 173 may also prevent a moire phenomenon from occurring when two prism sheets 172 are used and diffuse the light to increase the viewing angle which is narrowed by the prism sheet 172.

The optical sheet 170 may omit any of the above-mentioned sheets 171, 172, and 173, may include only some of the sheets 171, 172, and 173, and may further include an optical sheet having another characteristic. However, in the exemplary embodiment of the present invention, all of the individual sheets which constitute the optical sheet 170 should be isotropic, and the optical sheet 170 does not include the reflective polarization sheet.

In the present invention, the terminology "isotropic" means that a refractive index is constant regardless of a direction when light passes through a material, that is, "optical isotropy". However, it is understood that the refractive index may be not only completely constant and but also substantially constant. For example, an isotropic optical sheet may be formed of an isotropic material having reflective index differences in x-axis, y-axis, and z-axis directions of 0.1 or less.

The optical sheet 170 is isotropic to allow a polarization component, which passes through the reflective polarization layer 160, to reach the liquid crystal display panel, which is disposed above the optical sheet 170, without being degraded while passing through the optical sheet 170. Such an isotropic optical sheet 170 is formed, for example, by extruding or injection-molding a transparent plastic material, such as polycarbonate (PC), or an acryl-based resin, but the material or a forming method thereof is not limited thereto.

Figure 2:
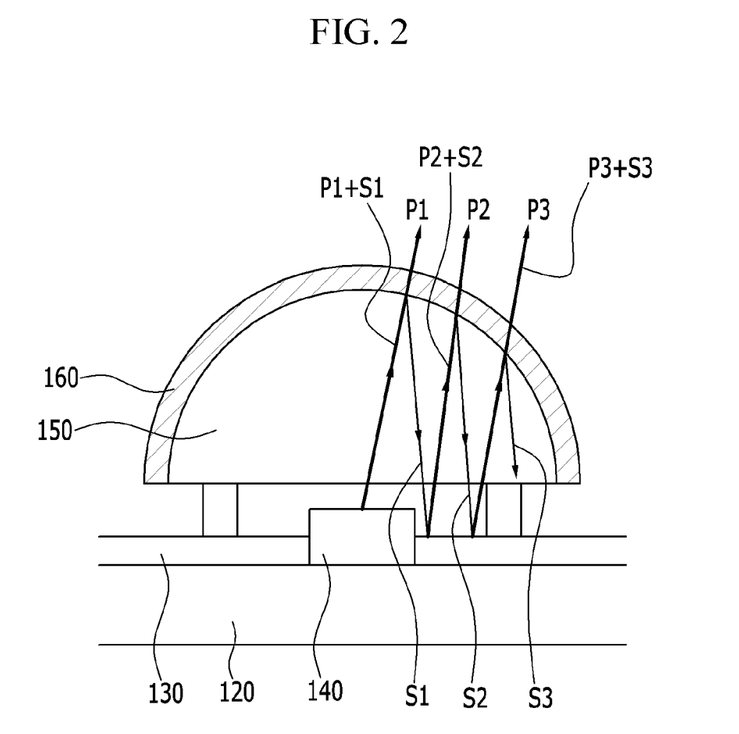
FIG. 2 is a cross-sectional view illustrating an optical lens module provided on a substrate on which a light emitting diode (LED) package is mounted according to an exemplary embodiment of the present invention.

FIG. 2 is a cross-sectional view illustrating an optical lens module provided on a substrate on which an LED package 140 is mounted. That is, only a portion which is directly connected with one optical lens 150 illustrated in cross-section. Herein, a structure where the reflective polarization layer 160 is disposed on the optical lens 150 may be referred to as an "optical lens module".

The reflective layer 130 is disposed on the substrate 120 and the LED package 140 is mounted on the substrate 120. The optical lens 150 is disposed above the LED package 140. Legs downwardly extending from a bottom surface of the optical lens 150 may be used to space the optical lens 150 apart from the substrate 120. Alternatively, the optical lens 150 may be fixed to the substrate 120 so as to be spaced apart from the light emitting surface of the LED package 140.

The reflective polarization layer 160, which can selectively transmit and reflect polarization components of light, is provided on an upper surface of the optical lens 150. For example, the reflective polarization layer 160 may transmit a P wave polarization component and reflect an S wave polarization component. Conversely, the reflective polarization layer 160 may transmit the S wave polarization component and reflect the P wave polarization component. Here, those skilled in the art may understand that the transmission or reflection of the polarization component does not mean that the polarization component is completely transmitted or reflected. For example, a small amount of optical loss may occur in accordance with the performance of the reflective polarization layer.

When the reflective polarization layer 160 has a characteristic which transmits the P wave polarization component and reflects the S wave polarization component, the P wave polarization component P1 of the light emitted from the LED light source passes through both the optical lens 150 and the reflective polarization layer 160, and travels toward the optical sheet 170 or the liquid crystal display panel which is disposed above the reflective polarization layer 160. In contrast, the S wave polarization component S1 of the light which passes through the optical lens 150 is reflected by the reflective polarization layer 160.

The S wave polarization component S1 of the light, which is reflected by the reflective polarization layer 160, is reflected below the bottom surface of the optical lens 150 by the reflective layer 130, which is disposed on the upper surface of the substrate 120, and is directed to the reflective polarization layer 160. When the S wave polarization component S1 is reflected by the reflective layer 130, the polarization direction is randomized. Accordingly, the reflected light which passes through the optical lens 150 to enter the reflective polarization layer 160 includes a P wave polarization component 2 and an S wave polarization component S2. The P wave polarization component P2 is transmitted through the reflective polarization layer 160, but the S wave polarization component S2 is reflected by the reflective polarization layer 160 such that the S wave polarization component S2 is transmitted toward the reflective layer 130.

The S wave polarization component S2, which is reflected by the reflective polarization layer 160, is reflected by the reflective layer 130, so that the polarization direction is randomized, and only a P wave polarization component P3 of the reflected light is transmitted by the reflective polarization layer 160 and an S wave polarization component S3 is reflected again by the reflective polarization layer 160.

As described above, the reflective polarization layer 160 selectively transmits the P wave polarization components and selectively reflects the S wave polarization components, and the reflective layer 130 reflects the S wave polarization components in a randomized polarization direction. The transmission, reflection, and re-reflection in the randomized polarization direction are repeated so that the P wave component, which transmits through the reflective polarization layer 160 to reach liquid crystal display panel, is increased.

Accordingly, the S wave polarization components S1, S2, S3 . . . which are absorbed by the polarizer of the liquid crystal display panel and result in optical loss, is converted into the P wave polarization components P2, P3, P4, . . . so that the light-utilization efficiency is significantly improved. This may result in a reduced power consumption of the liquid crystal display.

The light emitted from the reflective polarization layer 160 includes substantially one polarization component. Therefore, as described above, the optical sheet 170, which may be disposed on the reflective polarization layer 160, may be optically isotropic so as to maintain the polarization status of the polarization component.

The reflective polarization layer 160 may be formed directly on the upper surface of the optical lens 150, or may be manufactured as a separate sheet that is connected or adhered onto the upper surface of the optical lens 150. The reflective polarization layer 160 may have a shape which corresponds to the upper surface of the optical lens 150 and, thus, may have a curved surface. The reflective polarization layer 160 may be disposed so as to cover the entire upper surface through which the light is refracted from the optical lens 150.

The entire reflective polarization layer 160 may be closely adhered onto the upper surface of the optical lens 150, or a part of the reflective polarization layer 160 may be adhered onto the upper surface and a part of the reflective polarization layer may be spaced apart from the upper surface. Particularly, when a part of the upper surface of the optical lens 150, such as a center thereof, has a concave shape, it may be difficult to form the reflective polarization layer 160 in accordance with such a shape.

Figure 3A:
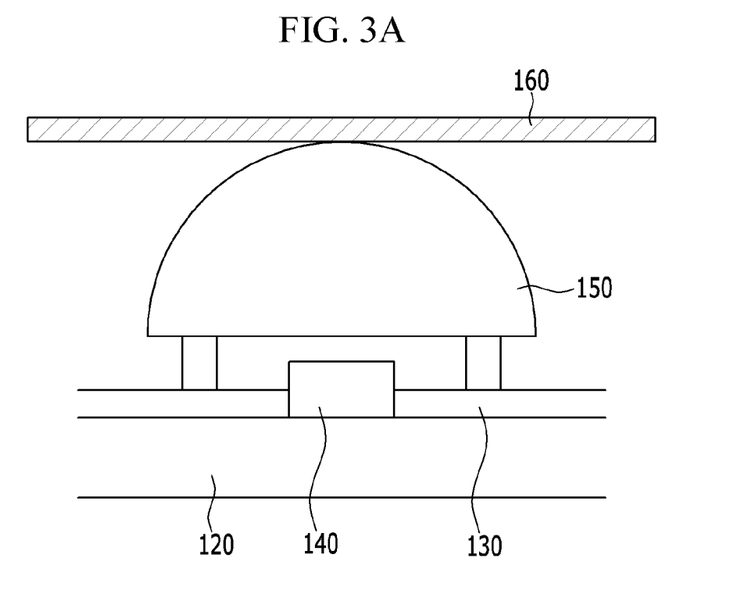
FIGS. 3A and 3B are cross-sectional views illustrating an optical lens module provided on a substrate on which an LED package is mounted according to exemplary embodiments of the present invention.
Figure 3B:
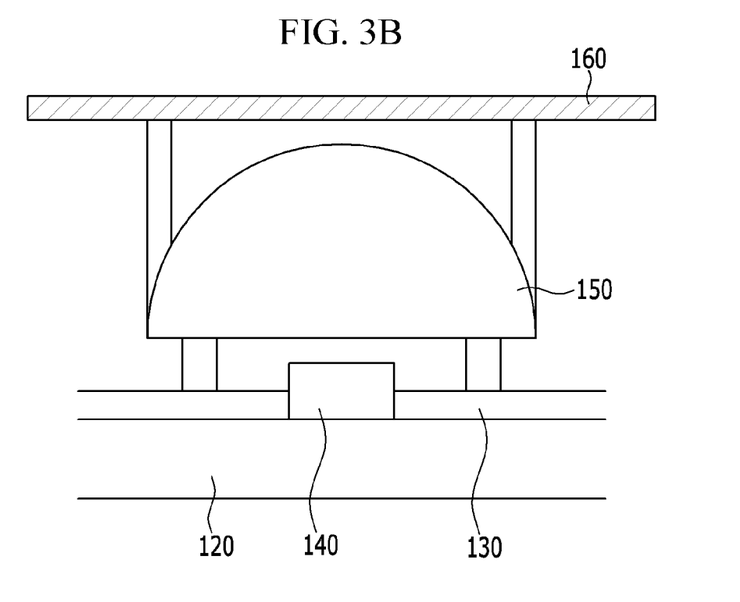

FIGS. 3A and 3B are cross-sectional views illustrating other exemplary embodiments of the present invention in which an optical lens module is provided on a substrate on which a LED package is mounted. Similarly to the exemplary embodiment of FIG. 2, the reflective layer 130 and the LED package 140 are mounted on the upper surface of the substrate 120. The optical lens 150 is provided above the LED package 140.

However, as opposed to the exemplary embodiment of FIG. 2, in which the reflective polarization layer 160 has a shape that corresponds to the shape of the upper surface of the optical lens 150, in the exemplary embodiment of FIG. 3A, the reflective polarization layer 160, which is substantially flat, is connected to the optical lens 150 such that the reflective polarization layer 160 is placed on the upper surface thereof. The reflective polarization layer 160 may be attached directly onto a part of the upper surface of the optical lens 150, or may be attached or assembled onto the optical lens 150 by a supporting unit that extends from the optical lens 150 (not illustrated). When the reflective polarization layer 160 is attached or assembled onto the optical lens 150, the reflective polarization layer 160 may be in contact with the upper surface of the optical lens 150 or may be attached or assembled onto the optical lens 150 so as to be spaced apart from the upper surface, as illustrated in the exemplary embodiment of FIG. 3B.

The reflective polarization layer 160 may be disposed so as to cover the entire upper surface of the optical lens 150. When a horizontal incision surface of the optical lens 150 is substantially semi-circular, the reflective polarization layer 160 may be circular so as to correspond to the horizontal incision surface. Further, the reflective polarization layer 160 may have a radius which is greater than a radius of a maximum horizontal incision surface of the optical lens 150, so as to receive all light refracted by the optical lens 150.

Figure 4:
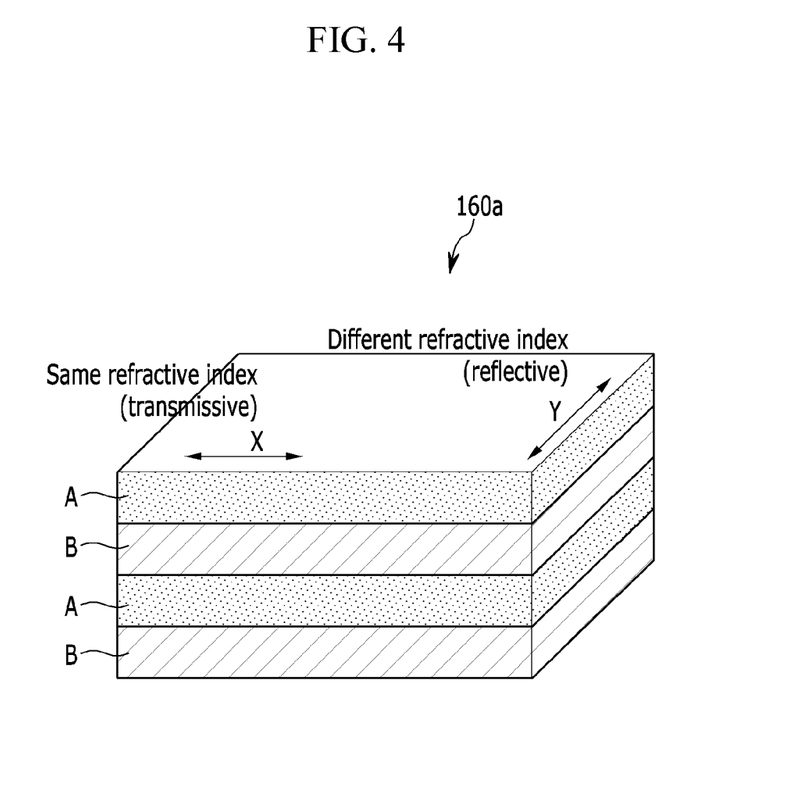
FIGS. 4 to 6 are diagrams illustrating examples of a structure of a reflective polarization layer which may be applied to an optical lens module according to an exemplary embodiment of the present invention.
Figure 5:
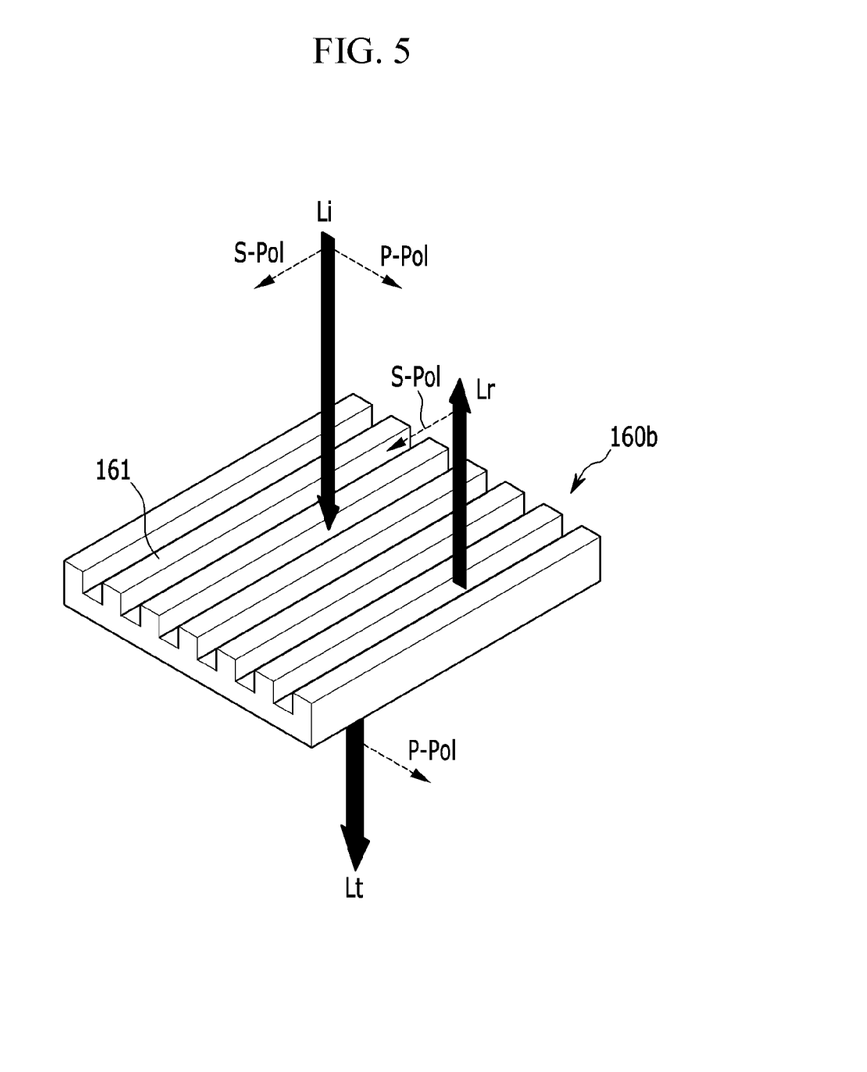
Figure 6:
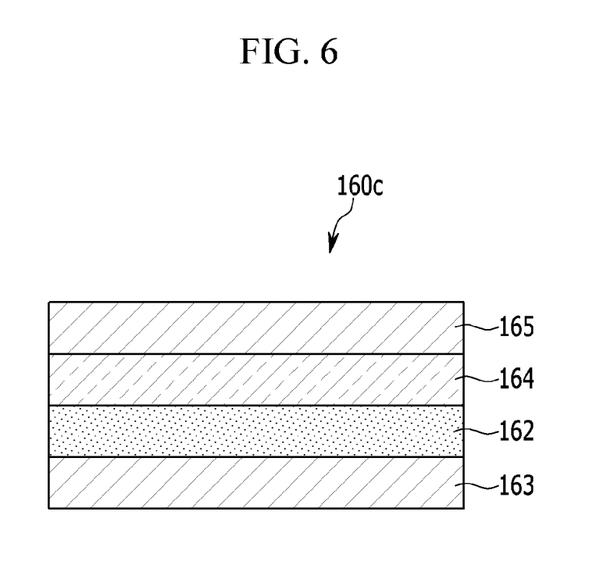

FIGS. 4 to 6 are diagrams illustrating examples of a structure of a reflective polarization layer 160 which may be applied to an optical lens module according to an exemplary embodiment of the present invention.

FIG. 4 illustrates a multi-layered optical film 160a having a refractive anisotropy. The optical film 160a may be substituted for the optical film 160. In FIG. 4, a layer A and a layer B have the same refractive index in an x-axis direction, but have different refractive indexes in a y-axis direction. The layer A may be formed of coPEN (a copolymer or a composition that has naphthalene dicarboxylic acid as a base member) and the layer B may be formed of PEN (polyethylene naphthalate). When several tens to several hundreds of layers A and B are laminated to form one multi-layered optical film. For example, a P wave polarization component may pass through the multi-layered optical film, but an S wave polarization component may be reflected. An example of the multi-layered optical film is widely known as a "DBEF" (dual brightness enhancement film), which is a product name of the 3M Corporation. According to an exemplary embodiment of the present invention, the multi-layered optical film may be adhered or mechanically assembled onto the upper surface of the optical lens.

FIG. 5 illustrates a structure of a wire grid film 160b, which may be substituted for the optical film 160b. The wire grid film 160b may have partition walls 161 having a pitch of 200 nm or less, for example, 150 nm or less, arranged on a transparent substrate (not shown), such as glass, in one direction, and a reflector (not shown) is applied to the partition walls 161. When light (Li) is incident onto the partition walls 161, a polarization component (S-Pol), which is parallel to the partition walls 161, is reflected (Lr), and a polarization component (P-Pol), which is perpendicular to the partition walls 161, is transmitted (Lt). Accordingly, similarly to the above-described multi-layered optical film 160a, the polarization components of light may be selectively transmitted and reflected. The wire grid film 160b may be adhered or assembled onto the upper surface of the optical lens, according to exemplary embodiments of the present invention.

FIG. 6 illustrates a structure 160c in which a cholesteric liquid crystal material is oriented. The structure 160c may include a liquid crystal layer 162, which is formed by aligning the cholesteric liquid crystal material, which has different refractive indices in accordance with direction, and coating the cholesteric liquid crystal material on a transparent base member 163. A phase difference compensation layer 164, which converts circular polarization into a linear polarization, is disposed on the liquid crystal layer 162. A base member film 165 may then be disposed on phase difference compensation layer 164. The cholesteric liquid crystal material may be coated directly on a surface of the optical lens 150, or as illustrated in FIG. 6, manufactured as a sheet shape to be adhered or assembled onto the optical lens 150.

FIGS. 7A, 7B, 8A, and 8B are diagrams illustrating an additional high reflective layer 132, where the elements are the same as in FIGS. 2 and 3 except that the reflective layer 130 is replaced with a normal reflective layer 131 and the high reflective layer 132. Below the optical lens 150, a high reflective layer 132 having high reflectance, which reflects light reflected by the reflective polarization layer 160, may be disposed. Because the reflectance of the high reflective layer 132 is greater than that of the normal reflective layer 131, re-utilization of the polarization component, which is reflected by the reflective polarization layer 160, may be increased. The term "high reflectance" is defined as a reflectance of at least 95% for a given wavelength value.

The high reflective layer 132 is, for example, formed by depositing a highly reflective metal layer, such as silver, and may also be referred to as a "silver reflective film". The high reflective layer 132 may be formed on the entire normal reflective layer 131. However, as illustrated in FIGS. 7A, 7B, 8A, and 8B, the high reflective layer 132 may be formed only directly below the optical lens 150 in consideration of manufacturing costs. The high reflective layer 132 may be formed so as to occupy a region that is equal to or larger than the maximum horizontal cross-section of the optical lens 150.

Figure 7A:
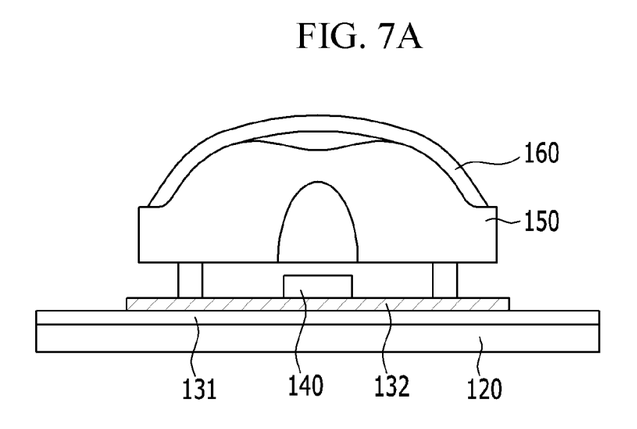
Figure 7B:
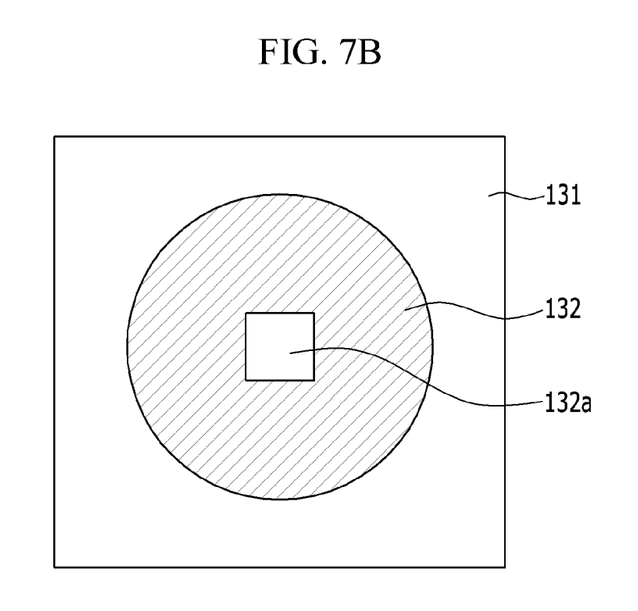
Figure 8A:
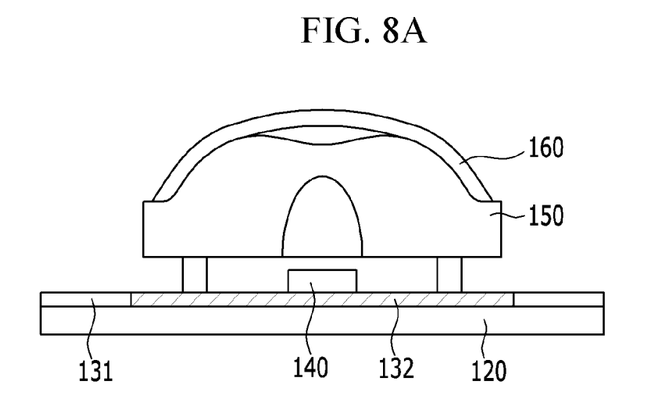
Figure 8B:
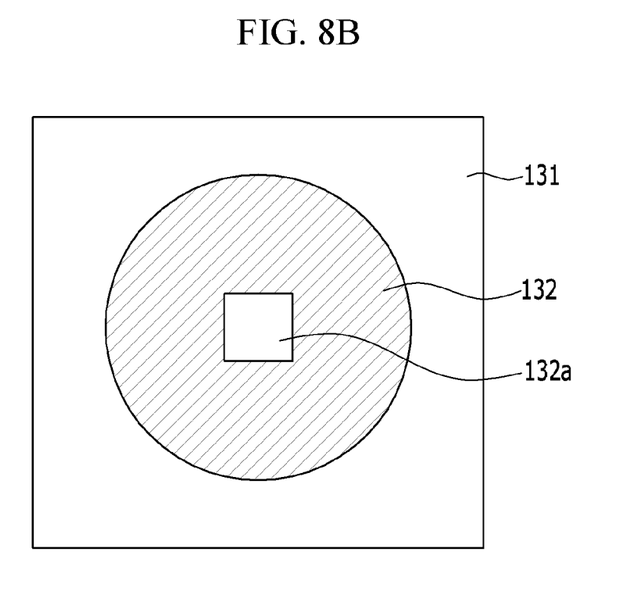

In FIGS. 7B and 8B, as viewed from the upper side before installing the LED package 140 and the circular optical lens 150, a quadrangle part 132a of a center of the high reflective layer 132 is a portion of the substrate where the LED package 140 is mounted, and the optical lens 150 is mounted above the high reflective layer 132.

The high reflective layer 132 may be, as illustrated in FIG. 7A, formed on the normal reflective layer 131, or as illustrated in FIG. 8A, formed directly on the substrate 120. When the high reflective layer 132 is formed directly on the substrate 120, the normal reflective layer 131 is not provided in a region where the high reflective layer 132 is formed. The normal reflective layer 131 is a reflective layer which is disposed on a substantially entire surface in a general backlight unit to implement an outer appearance of the display screen to be uniform while reflecting the light which is directed to a rear surface direction to a front surface direction. The normal reflective layer 131 is generally called a "white reflective film" and may be formed of a material such as poly ethylene terephthalate (PET), and poly propylene (PP).

Figure 9:
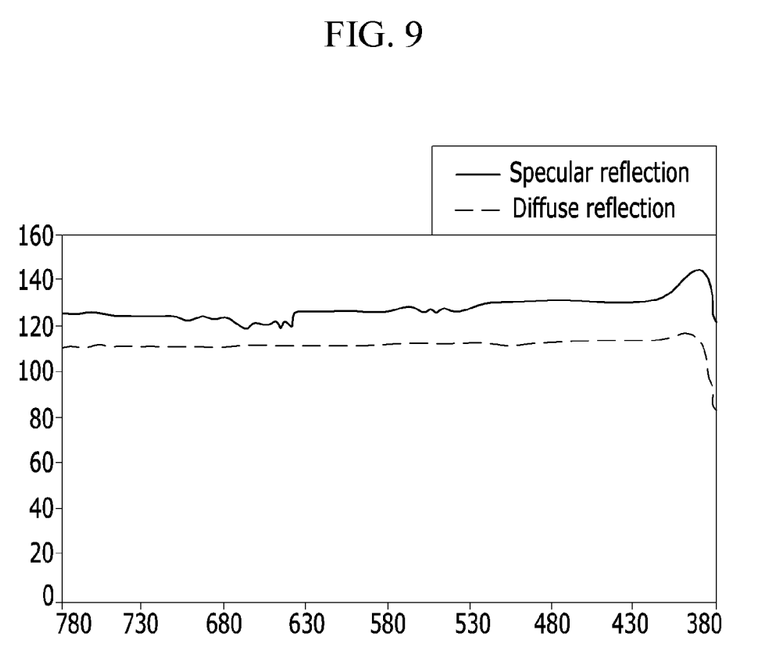
FIG. 9 is a graph illustrating a relative reflectance with respect to BaSO$_4$ reflectance of diffuse reflection with reflectance of 90% and specular reflection with reflectance of 100%.

FIG. 9 is a graph illustrating a relative reflectance with respect to $BaSO_4$ reflectance of diffuse reflection with reflectance of 90% and specular reflection with reflectance of 100%. The diffuse reflection corresponds to reflection by the normal reflective layer and the specular reflection corresponds to reflection by the high reflective layer. In both cases, the reflectance is higher than a reference of barium sulfate.

As a result of a simulation that applies the reflective polarization layer 160 to a upper surface of the optical lens 150, and applies the diffuse reflection and the specular reflection below the bottom surface of the optical lens 150, the total light amount which is transmitted through the reflective polarization layer 160 is measured to be approximately 3670 lm in the former case and 3798 lm in the latter case. This means that if the high reflective layer 132 is applied below the optical lens, the luminance is increased.

Figure 10:
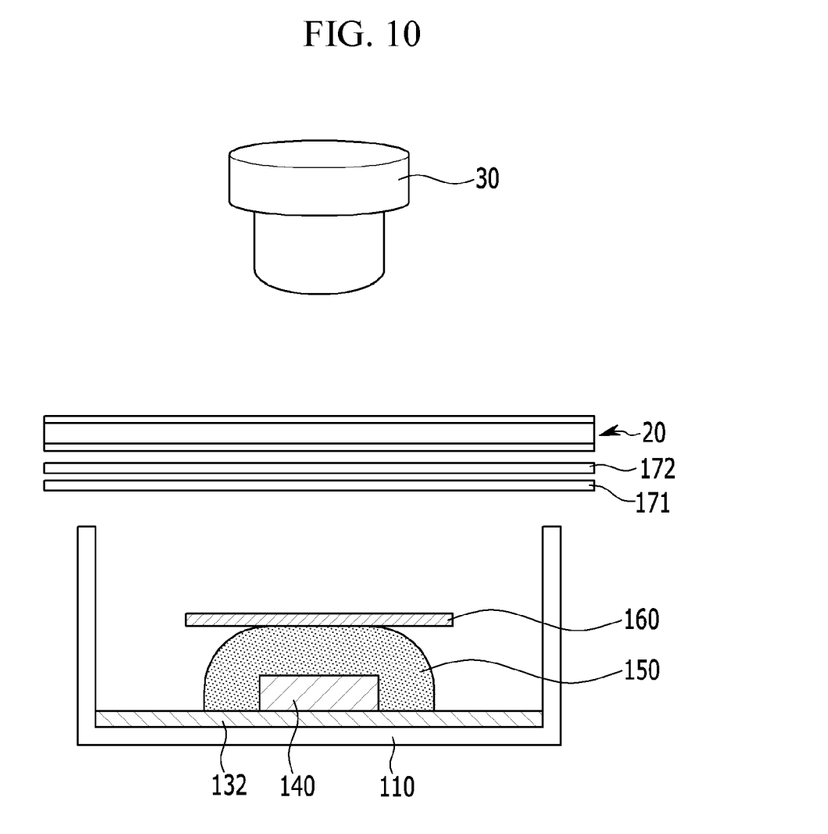
FIG. 10 is a layout view of a backlight unit, a liquid crystal display panel, and a measurement device for transmittance simulation.

FIG. 10 is a layout view of a backlight unit and a liquid crystal display panel for transmittance simulation. Referring to FIG. 10, in the simulation, when the high reflective layer 132 is applied below the optical lens 150, the reflective polarization layer 160 is applied on the upper surface thereof, the diffuser sheet 171 and the prism sheet 172 are applied thereon, and the liquid crystal display panel is disposed at the top, light which passes through the liquid crystal display panel is measured by a transmittance measurement device 30.

For various exemplary embodiments and Comparative Examples, the transmittance is simulated while omitting some of layers (or sheets) or varying a property thereof. The polarization efficiency is obtained by calculating transmittance $T_\parallel$ when a transmissive axis of the reflective polarization layer 160 is disposed to be parallel to a transmissive axis of the polarizer which is attached onto the liquid crystal display panel and transmittance $T_\perp$ when the transmissive axes are vertical to each other and calculating the polarization efficiency using the following Equation, and the result is represented in Table 1.

$$\text{Polarization efficiency} = \sqrt{\frac{|T_\parallel - T_\perp|}{|T_\parallel + T_\perp|}} \times 100$$

TABLE 1

| | Optical arrangement | polarization efficiency |
|---|---|---|
| Exemplary Embodiment 1 | High reflective layer + optical lens + reflective polarization layer | 87% |
| Exemplary Embodiment 2 | High reflective layer + optical lens + reflective polarization layer + isotropic pattern diffuser sheet | 84% |
| Exemplary Embodiment 3 | High reflective layer + optical lens + reflective polarization layer + isotropic pattern diffuser sheet + isotropic prism sheet | 78% |
| Comparative Example 1 | High reflective layer + optical lens (no reflective polarization layer) | 26% |
| Comparative Example 2 | High reflective layer + optical lens + reflective polarization layer + bead diffuser sheet | 26% |
| Comparative Example 3 | High reflective layer + optical lens + reflective polarization layer + isotropic diffuser sheet + anisotropic prism sheet | 9% |

As seen from Table 1, when the reflective polarization layer 160 and the high reflective layer 132 are applied above and below the optical lens 150, the polarization efficiency is high, and if the isotropic optical lens is applied thereon, the efficiency is reduced somewhat. Here, it is considered that a sheet which is obtained by extracting polycarbonate (PC) is used as the isotropic optical sheet, and the sheet does not have complete isotropy, so that the efficiency is reduced. However, it is also known that when the anisotropic optical sheet is applied on the reflective polarization layer 160, or no reflective polarization layer 160 is applied, the polarization efficiency is very low.

According to the optical lens module and the backlight unit of the present invention, a small-sized reflective polarization layer is applied only to an optical lens so that the manufacturing cost and the weight of the product may be reduced while maximizing an optical efficiency of the liquid crystal display device.

While this invention has been described in connection with what is presently considered to be practical exemplary embodiments, it will be apparent to those skilled in the art that various modifications and variations can be made in the present invention without departing from the spirit and scope of the present invention as defined by the following claims. Thus, it is intended that the present invention cover the modifications and variations of this invention provided they come within the scope of the appended claims and their equivalents.

What is claimed is:

1. An optical lens module, comprising:
a point light source;
an optical lens disposed above the point light source and configured to refract light output from the point light source; and
a reflective polarization layer disposed on the optical lens and configured to transmit a first polarization component of the refracted light and reflect a second polarization component of the refracted light,
wherein the optical lens has a curved surface, and the reflective polarization layer contacts the curved surface of the optical lens.

2. The optical lens module of claim 1, wherein the reflective polarization layer is directly formed on an upper surface of the optical lens.

3. The optical lens module of claim 1, wherein the reflective polarization layer is attached to an upper surface of the optical lens.

4. The optical lens module of claim 1, wherein the reflective polarization layer is spaced apart from an upper surface of the optical lens.

5. The optical lens module of claim 1, wherein the reflective polarization layer entirely covers an upper surface of the optical lens.

6. The optical lens module of claim 1, wherein the reflective polarization layer comprises a multi-layered optical film structure having refractive anisotropy.

7. The optical lens module of claim 1, wherein the reflective polarization layer comprises a wire grid structure.

8. The optical lens module of claim 1, wherein:
the reflective polarization layer comprises a cholesteric liquid crystal layer, and
the cholesteric liquid crystal has refractive indices that differ in different directions.

9. A direct-type backlight unit, comprising:
a point light source mounted on a substrate;
an optical lens disposed above the point light source and configured to refract light output from the point light source;
a reflective polarization layer disposed on the optical lens and configured to transmit a first polarization component of the refracted light and to reflect a second polarization component of the refracted light; and
a reflective layer disposed below the optical lens and configured to reflect the second polarization component,
wherein the optical lens has a curved surface, and the reflective polarization layer contacts the curved surface of the optical lens.

10. The direct-type backlight unit of claim 9, wherein the reflective polarization layer is formed directly on an upper surface of the optical lens.

11. The direct-type backlight unit of claim 9, wherein the reflective polarization layer is attached to an upper surface of the optical lens.

12. The direct-type backlight unit of claim 9, wherein the reflective polarization layer is spaced apart from an upper surface of the optical lens.

13. The direct-type backlight unit of claim 9, wherein the reflective polarization layer entirely covers an upper surface of the optical lens.

14. The direct-type backlight unit of claim 9, wherein the reflective layer has a reflectance of at least 95%.

15. The direct-type backlight unit of claim 9, wherein the reflective layer is attached to an upper surface of the substrate.

16. The direct-type backlight unit of claim 9, wherein the reflective layer is formed on a diffuse reflective sheet.

17. The direct-type backlight unit of claim 9, wherein the reflective layer has an area that is equal to or greater than the area of the optical lens.

18. The direct-type backlight unit of claim 9, further comprising at least one isotropic optical sheet disposed above the reflective polarization layer.

19. The direct-type backlight unit of claim 18, wherein the isotropic optical sheet comprises an isotropic diffuser sheet and an isotropic prism sheet.

20. The direct-type backlight unit of claim 19, wherein the optical sheet comprises an isotropic material having reflective indexes in x-axis, y-axis, and z-axis directions which differ from each other by 0.1 or less.

21. The direct-type backlight unit of claim 9, wherein the point light source comprises at least one light emitting diode (LED).

\* \* \* \* \*